United States Patent
Hensler

(10) Patent No.: US 12,113,704 B2
(45) Date of Patent: Oct. 8, 2024

(54) USING A ROUTING PROTOCOL FOR NETWORK PORT FAILOVER

(71) Applicant: Microsoft Technology Licensing, LLC, Redmond, WA (US)

(72) Inventor: Kenyon James Hensler, Acworth, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 372 days.

(21) Appl. No.: 17/712,913

(22) Filed: Apr. 4, 2022

(65) Prior Publication Data
US 2023/0318968 A1   Oct. 5, 2023

(51) Int. Cl.
| | |
|---|---|
| H04L 45/28 | (2022.01) |
| H04L 12/66 | (2006.01) |
| H04L 45/02 | (2022.01) |
| H04L 45/12 | (2022.01) |
| H04L 45/645 | (2022.01) |
| H04L 69/325 | (2022.01) |

(52) U.S. Cl.
CPC ............. *H04L 45/28* (2013.01); *H04L 12/66* (2013.01); *H04L 45/04* (2013.01); *H04L 45/12* (2013.01); *H04L 45/645* (2022.05); *H04L 69/325* (2013.01)

(58) Field of Classification Search
CPC ......... H04L 45/28; H04L 12/66; H04L 45/04; H04L 45/12; H04L 45/645; H04L 69/325
See application file for complete search history.

(56) References Cited

PUBLICATIONS

Hensler, Kenyon, "ESXi as a BGP Speaker", Retrieved From: https://vskeeball.com/2021/11/29/esxi-as-a-bgp-speaker/, Nov. 29, 2021, 08 Pages.

*Primary Examiner* — Kodzovi Acolatse
*Assistant Examiner* — Anindita Sen
(74) *Attorney, Agent, or Firm* — Workman Nydegger

(57) ABSTRACT

Using a routing protocol for network port failover. A network stack, which does not perform reverse path forwarding, includes a first interface as a loopback interface that is assigned a first internet protocol (IP) address, a second interface to a first network port, and a third interface to a second network port. The routing protocol is configured to communicate over the second interface with a first port at remote network device(s), and to communicate over the third interface with a second port at the remote network device(s). A route comprising the first IP address is announced to the remote network device(s), and default route of the network stack is configured to egress IP packets via the second interface. Later, the routing protocol indicates that there is a forwarding failure associated with the second interface, and the default route is configured to egress IP packets via the third interface.

20 Claims, 6 Drawing Sheets

USING A ROUTING PROTOCOL FOR NETWORK PORT FAILOVER

BACKGROUND

Computer systems have been coupled to one another, and to other electronic devices, to form computer networks over which the computer systems and other electronic devices can transfer electronic data. In some computer networks, a computer system comprises a plurality of physical network ports (e.g., as part of network interface cards), such that the computer system can be physically connected (using wired and wireless connections) using a plurality of communications channels. For example, a computer system may include a plurality of network interface cards, each connected to a different port on a switch, or connected to different ports on different switches.

In many computing environments, a plurality of physical network ports of a computer system (e.g., a single server computer system) are used to provide for redundant data connections, for data load balancing, and the like. Some of these computing environments, such as a VMware ESX or ESXi virtualization hosts, are limited in their ability to detect when (a) the physical link status of given port remains up (e.g., there is a still a physical connection between a host's port and a switch's port), but (b) Internet Protocol (IP) traffic egressing from that port is not being forwarded (e.g., due to a misconfiguration of failure at the switch). This is due to these computing environments using a single network stack for all physical ports, due to that network stack having only one default route, and due to these computing environments lacking dynamic routing support.

One potential way to detect forwarding failures in computing environments with these restrictions is to use beacon probing. With beacon probing, the host transmits an open systems interconnection (OSI) model layer-two (data link) frame from one of the host's ports, and then watches for that frame to be received at the host's other ports—with lack of the frame being received at the other ports indicating a forwarding failure. However, for deterministic failure detection, beacon probing requires that the host have at least three physical ports, each connected to a different physical switch. Additionally, since beacon probing operates using OSI model layer-two frames, the network switches involved must be linked at OSI model layer-two, and thus cannot be connected in a fully routed (e.g., spine-leaf) manner. Each of these restrictions limits the applicability of beacon probing at many hosts, and in many computer networks.

As such, computing environments, such as a VMware ESX or ESXi hosts, may not be able to detect and manage failover between network ports, which can lead to IP packet loss and faults in the services running at those computing environments.

BRIEF SUMMARY

At least some embodiments described herein use an IP routing protocol, such as border gateway protocol (BGP), open shortest path first (OSPF), routing information protocol (RIP), and the like, combined with loose reverse path forwarding and assignment of a host's externally visible IP address to a loopback interface, to detect forwarding failures and handle failover between physical network ports. For example, in embodiments, a computer system uses a routing protocol to establish at least (a) a first ongoing connection over an external uplink between a first network port at the computer system and a first remote network port at one or more remote network devices, and (b) a second ongoing connection over an external uplink between a second network port at the computer system and a second remote network port at the remote network device(s). In embodiments, the computer system also assigns an IP address to a loopback interface of its network stack that has no network port assignment, and announces this IP address (e.g., using the routing protocol) to one or more remote network device(s) as a route. In embodiments, announcing this route to the remote network device(s) enables the remote network device(s) to route IP packets destinated to this IP address through any of the computer system's external uplinks.

In embodiments, the computer system also configures a default route of its network stack to egress outbound IP packets via an interface corresponding to one of the computer system's network ports over which a routing protocol connection was established. In embodiments, the computer system's network stack has loose reverse path forwarding (e.g., a reverse path forwarding feature is not present or has been disabled), such that when IP packets are egressed via the default route, the network stack "spoofs" the source address of the IP packet, indicating that the IP address of the loopback interface is the source address of the IP packet (e.g., rather than using an IP address of the interface of the default route). By announcing the IP address of the loopback interface to external network devices, and by using loose reverse path forwarding, the computer system is able to use the IP address of the loopback interface to provide services to external network devices, even though those IP packets are being communicated through the interface corresponding to one of the network ports.

In embodiments, the computer system monitors the routing protocol connections to determine whether IP packets egressed the corresponding network ports can be forwarded by the remote network device(s). In one embodiment, these ongoing connections communicate BGP control plane data, and a failure to communicate this control plane data indicates a failure by the remote network device(s) to forward IP packets. In embodiments, when the computer system detects an IP packet forwarding failure on the network port that is being used as the default route, the computer system updates its default route to egress outbound IP packets via a different interface corresponding to a network port that is still able to forward IP packets. Thus, a failover between network ports and continuity of data communication is achieved, all while being able to communicate IP packets using the IP address of the loopback interface regardless of which network port is actually being used to communicate those IP packets to eternal network devices.

By use a routing protocol, loose reverse path forwarding, and a unique use of a loopback interfaces and default routes to detect forwarding failures and handle failover between physical network ports in this manner, embodiments can handle failover between physical network ports even when there are only two network ports, and thus two uplinks to two switches, are available. In embodiments, this enables computing environments, such as a VMware ESX or ESXi hosts, to detect and manage failover between network ports even in constrained environments. Additionally, in embodiments the routing protocol operates at OSI model layer-three (network), and thus full routing (e.g., spine-leaf) between the switches involved can be achieved while still being able to detect and manage failover between network ports. Additionally, excluding OSI model layer-two routing across switches (e.g., top-of-rack switches) brings about increased security, increased routing performance, and decreased power consumption.

In some aspects, the techniques described herein relate to a method, implemented at a computer system that includes a processor and a plurality of network ports, for using a routing protocol for network port failover in a single network stack environment having a single default route, the method including: identifying a plurality of interfaces configured at a network stack that does not perform reverse path forwarding, including identifying at least: a first interface provided by the network stack as a loopback interface, and that is assigned a first IP (internet protocol) address corresponding to a first IP subnet, a second interface provided by the network stack as an interface to a first network port of the plurality of network ports, and that is assigned a second IP address corresponding to a second IP subnet that is different than the first IP subnet, and a third interface provided by the network stack as an interface to a second network port of the plurality of network ports, and that is assigned a third IP address corresponding to a third IP subnet that is different than each of the first IP subnet and the second IP subnet; configuring a routing protocol to communicate over the second interface with a first port at one or more remote network devices, and to communicate over the third interface with a second port at one or more remote network devices; announcing, to the one or more remote network devices, a route including the first IP address; configuring a default route of the network stack to egress IP packets via the second interface; after configuring the network stack to route IP packets via the second interface, determining, based on the routing protocol, that there is a forwarding failure associated with the second interface; and based on determining that there is a forwarding failure associated with the second interface, configuring the default route of the network stack to egress IP packets via the third interface.

In some aspects, the techniques described herein relate to a computer system for using a routing protocol for network port failover in a single network stack environment having a single default route, including: a processor; a plurality of network ports; and a computer storage medium that stores computer-executable instructions that are executable by the processor to cause the computer system to at least: identify a plurality of interfaces configured at a network stack that does not perform reverse path forwarding, including identifying at least: a first interface provided by the network stack as a loopback interface, and that is assigned a first IP (internet protocol) address corresponding to a first IP subnet, a second interface provided by the network stack as an interface to a first network port of the plurality of network ports, and that is assigned a second IP address corresponding to a second IP subnet that is different than the first IP subnet, and a third interface provided by the network stack as an interface to a second network port of the plurality of network ports, and that is assigned a third IP address corresponding to a third IP subnet that is different than each of the first IP subnet and the second IP subnet; configure a routing protocol to communicate over the second interface with a first port at one or more remote network devices, and to communicate over the third interface with a second port at one or more remote network devices; announce, to the one or more remote network devices, a route including the first IP address; configure a default route of the network stack to egress IP packets via the second interface; after configuring the network stack to route IP packets via the second interface, determine, based on the routing protocol, that there is a forwarding failure associated with the second interface; and based on determining that there is a forwarding failure associated with the second interface, configure the default route of the network stack to egress IP packets via the third interface.

In some aspects, the techniques described herein relate to a computer program product including a computer storage medium that stores computer-executable instructions that are executable by a processor to cause a computer system to use a routing protocol for network port failover in a single network stack environment having a single default route, the computer-executable instructions including instructions that are executable by the processor to cause the computer system to at least: identify a plurality of interfaces configured at a network stack that does not perform reverse path forwarding, including identifying at least: a first interface provided by the network stack as a loopback interface, and that is assigned a first IP (internet protocol) address corresponding to a first IP subnet, a second interface provided by the network stack as an interface to a first network port of a plurality of network ports of the computer system, and that is assigned a second IP address corresponding to a second IP subnet that is different than the first IP subnet, and a third interface provided by the network stack as an interface to a second network port of the plurality of network ports, and that is assigned a third IP address corresponding to a third IP subnet that is different than each of the first IP subnet and the second IP subnet; configure a routing protocol to communicate over the second interface with a first port at one or more remote network devices, and to communicate over the third interface with a second port at one or more remote network devices; announce, to the one or more remote network devices, a route including the first IP address; configure a default route of the network stack to egress IP packets via the second interface; after configuring the network stack to route IP packets via the second interface, determine, based on the routing protocol, that there is a forwarding failure associated with the second interface; and based on determining that there is a forwarding failure associated with the second interface, configure the default route of the network stack to egress IP packets via the third interface.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
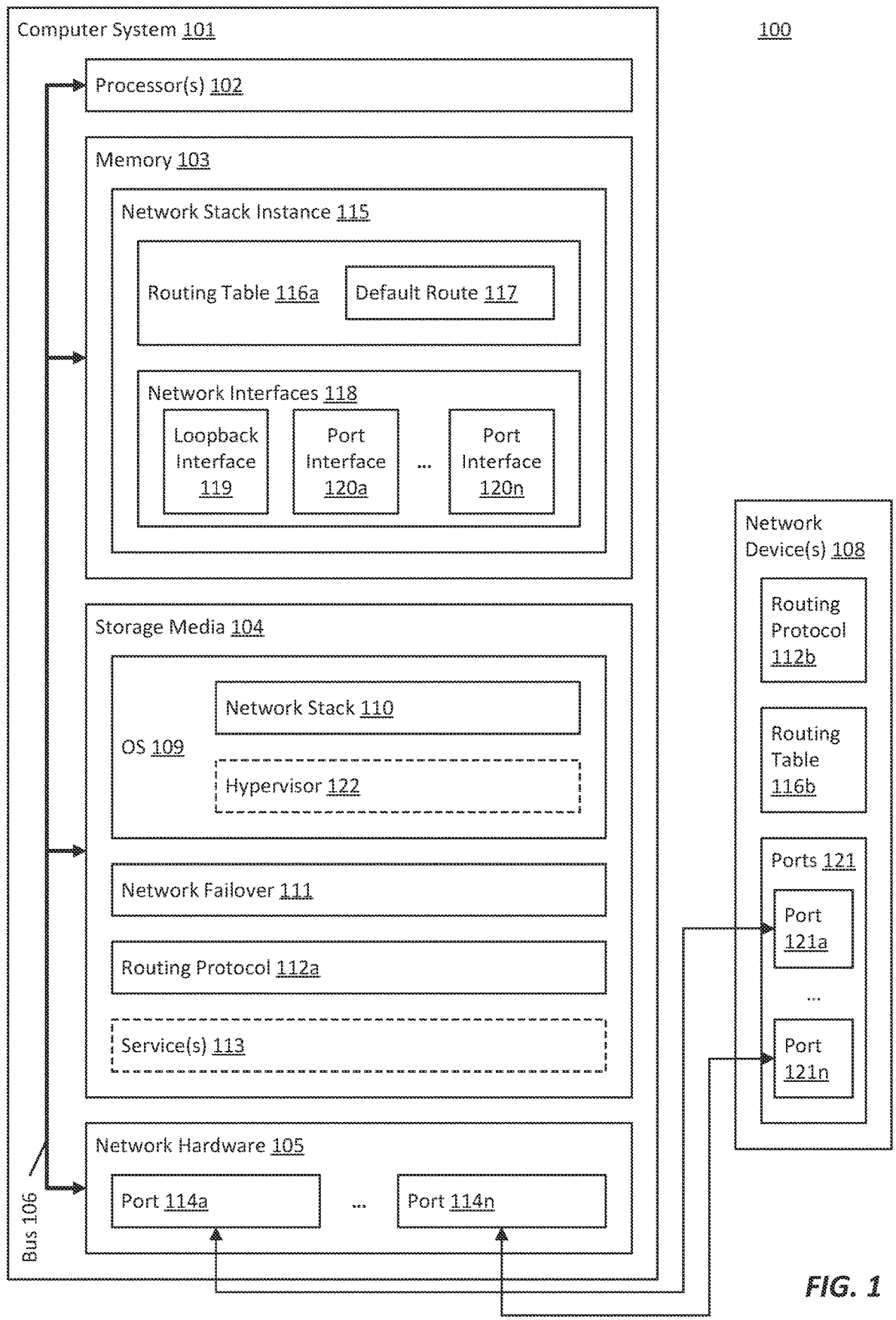
FIG. 1 illustrates an example computer architecture that facilitates using a routing protocol for physical network port failover.

FIG. 1 illustrates an example computer architecture 100 that facilitates using a routing protocol for physical network port failover, particularly in environments in which there is one IP stack, with a single default gateway, that provides interfaces for two or more physical network ports. As shown, computer architecture 100 includes a computer system 101 comprising processor(s) 102 (e.g., a single processor, or a plurality of processors), memory 103 (e.g., system or main memory), storage media 104 (e.g., a single computer-readable storage medium, or a plurality of computer-readable storage media), and network hardware 105 (including a plurality of physical network ports, including port 114a to port 114n), all interconnected by a bus 106.

Computer architecture 100 also includes network device(s) 108 (e.g., a single network device, or a plurality of network devices) to which the computer system 101 is interconnected via network hardware 105. For example, network device(s) 108 are shown as including a plurality of physical network ports 121 (i.e., port 121a to port 121n), with port 114a at computer system 101 being interconnected/uplinked to port 121a at network device(s) 108, and port 114n at computer system 101 being interconnected/uplinked to port 121n at network device(s) 108. In embodiments, network device(s) 108 comprise one or more switches, one or more other computer systems, and the like.

The storage media 104 is illustrated as storing computer-executable instructions corresponding to one or more of an operating system (OS) 109, a network failover component 111, a routing protocol component 112a (e.g., implementing BGP, OSPF, RIP), or service(s) 113. As shown, the OS 109 comprises a network stack 110, and potentially comprises a hypervisor 122, though in some embodiments in which the hypervisor 122 is present the hypervisor 122 is separate from the OS 109. When the hypervisor 122 is present, in embodiments the computer system 101 is a virtualization host, such as a VMware ESX or ESXi host. Regardless of whether or not the computer system 101 is a virtualization host, in embodiments the computer system 101 provides service(s) 113, which can include one or more network-facing services.

FIG. 1 shows that, using the network stack 110, the OS 109 instantiates a network stack instance 115 (represented within memory 103) that includes a routing table 116a and network interfaces 118 (i.e., virtual network interfaces). As shown, in embodiments, the network interfaces 118 include a loopback interface 119. In embodiments, the loopback interface 119 is a pseudo interface that lacks any association with an external network port (or external uplink). In embodiments, the network interfaces 118 also include two or more port interfaces—including port interface 120a and port interface 120n. In embodiments, each port interface enables communications via a corresponding network port within network hardware 105. For example, port interface 120a corresponds to port 114a and enables external communications via an uplink to port 121a, and port interface 120n corresponds to port 114n and enables external communications via an uplink to port 121n.

In embodiments, within the foregoing environment, the network failover component 111 operates to use an OSI model layer-three routing protocol (e.g., BGP, OSPF, RIP), combined with loose reverse path forwarding by the network stack 110, and assignment of an IP address to loopback interface 119, to detect forwarding failures (e.g., by network device(s) 108) and handle failover between available physical network ports (e.g., between port 114a and port 114n).

Figure 2:
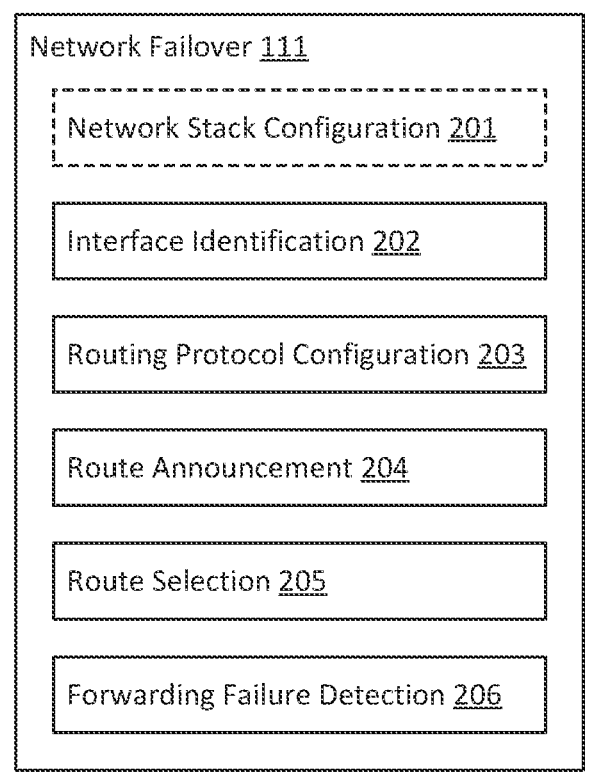
FIG. 2 illustrates an example of a network failover component.

FIG. 2 illustrates an example 200 of the network failover component 111 of FIG. 1. As shown, in embodiments the network failover component 111 includes a network stack configuration component 201, an interface identification component 202, a routing protocol configuration component 203, a route announcement component 204, a route selection component 205, and/or a forwarding failure detection component 206. Each component of the network failover component 111 depicted in FIG. 2 represents various functionalities that network failover component 111 might implement in accordance with various embodiments described herein. It will be appreciated, however, that the depicted components—including their identity and arrangement—are presented merely as an aid in describing various embodiments of the network failover component 111.

Figure 3A:
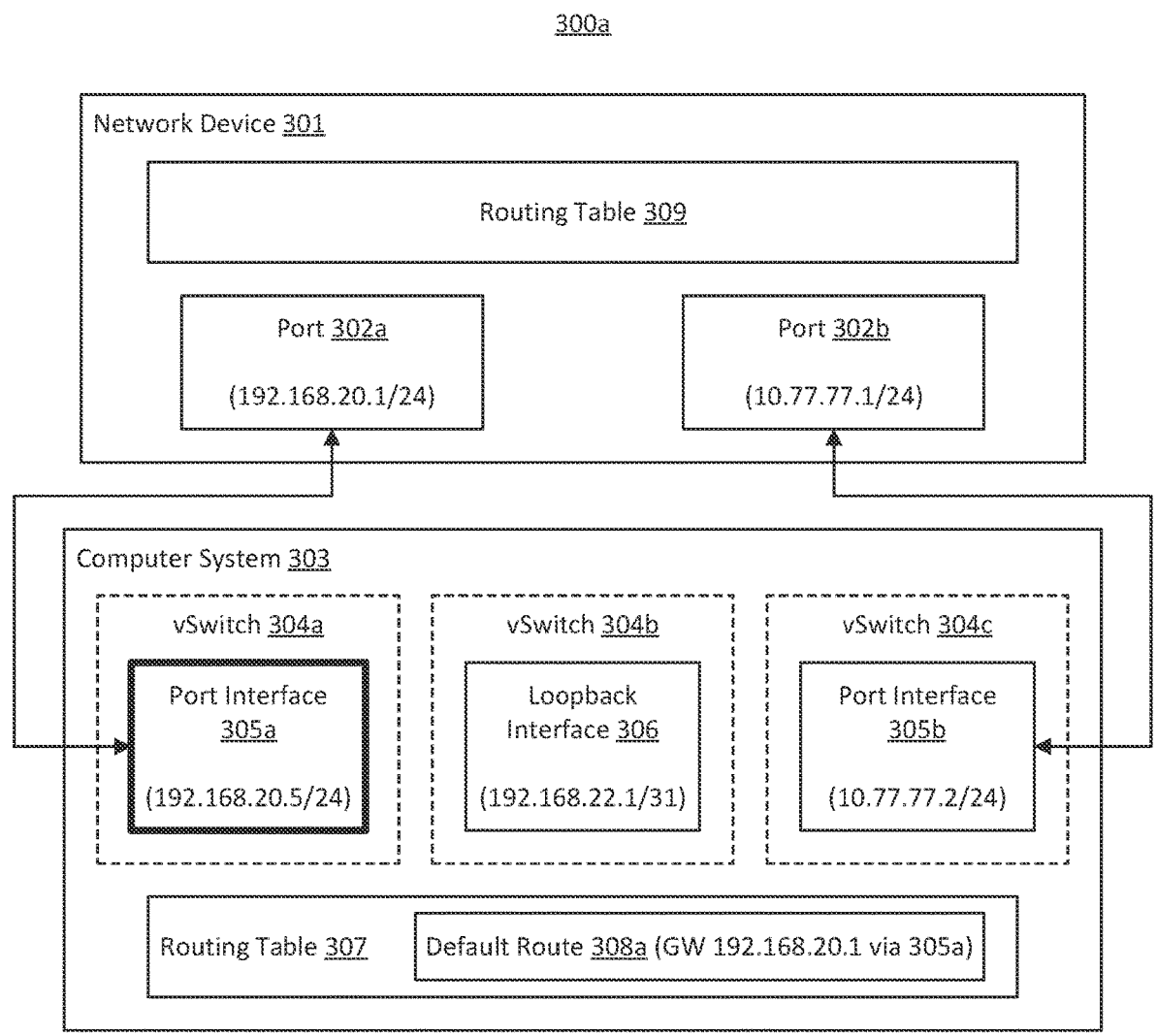
FIGS. 3A-3C illustrate examples of using a routing protocol for physical network port failover.

The components of the network failover component 111, as illustrated in FIG. 2, are now described in connection with FIGS. 3A-3C, which illustrate examples of using a routing protocol for physical network port failover. Initially, FIG. 3A illustrates an example 300a of a network environment that includes a network device 301 (e.g., one or more of network device(s) 108) and a computer system 303 (e.g., computer system 101). As shown, computer system 303 comprises a port interface 305a (e.g., port interface 120a, corresponding to port 114a) that has an uplink with a port 302a (e.g., port 121a) at the network device 301, and a port interface 305b (e.g., port interface 120n, corresponding to port 114n) that has an uplink with a port 302b (e.g., port 121n) at the network device 301. Additionally, computer system 303 comprises a loopback interface 306 (e.g., loopback interface 119). Each interface at computer system 303 are shown as being part of a separate virtual switch (i.e., vSwitch 304a, vSwitch 304b, vSwitch 304c), though some embodiments may omit this configuration (as indicated by broken lines).

Returning to FIG. 2, in embodiments, the network stack configuration component 201 includes functionality to create and configure one or more loopback and/or port interfaces within network interfaces 118, and/or to disable reverse path forwarding at the network stack instance 115 (if needed). In some embodiments, these configurations are made separate from the network failover component 111 (e.g., by the OS 109, by the service(s) 113, manually by a system administrator, etc.), so the network stack configuration component 201 is illustrated in broken lines to indicate that it could be optional.

Regardless of how they are created/configured, in embodiments network interfaces 118 include the loopback interface 119 that is assigned an IP address that will be used externally for service(s) 113. For example, in FIG. 3A, loopback interface 306 is illustrated as being assigned a 192.168.22.1 IP address with a 31-bit mask (i.e., subnet 192.168.22.0/31). Additionally, in embodiments, network interfaces 118 include two or more port interfaces that are each configured to communicate with one of the physical network ports 121 at the network device(s) 108. For example, in FIG. 3A, port interface 305a is illustrated as being assigned a 192.168.20.5 IP address with a 24-bit mask (i.e., subnet 192.168.20.0/24), while its uplinked port (i.e., port 302a) is illustrated as being assigned a 192.168.20.1 IP address with a 24-bit mask (i.e., subnet 192.168.20.0/24). Additionally, in FIG. 3A, port interface 305b is illustrated as being assigned a 10.77.77.2 IP address with a 24-bit mask (i.e., subnet 10.77.77.0/24), while its uplinked port (i.e., port 302*b*) is illustrated as being assigned a 10.77.77.2 IP address with a 24-bit mask (i.e., subnet 10.77.77.0/24).

In embodiments, the interface identification component 202 identifies available network interfaces from network interfaces 118, including identifying at least the loopback interface 119 and two or more port interfaces (e.g., port interface 120*a* and port interface 120*n*). In embodiments, the interface identification component 202 also identifies parameters of those interfaces, such as assigned IP addresses, subnets, and the like. Thus, in embodiments, the interface identification component 202 identifies loopback interface 306 and port interfaces 305*a*, 305*b*, along with their IP configuration as just described. In some embodiments, the interface identification component 202 also identifies the IP configuration of port 302*a* and port 302*b* at network device 301.

In embodiments, the routing protocol configuration component 203 uses the routing protocol component 112*a* to establish ongoing routing protocol connections between two or more physical ports at computer system 101 (e.g., port 114*a* to port 114*n*) and different ports at the network device(s) 108 (e.g., port 121*a* to port 121*n*). Thus, the routing protocol configuration component 203 uses the routing protocol component 112*a* to establish at least (a) a first ongoing connection over an external uplink between a first network port (e.g., port 114*a*) at computer system 101 and a first remote network port (e.g., port 121*a*) at network device(s) 108, and (b) a second ongoing connection over an external uplink between a second network port (e.g., port 114*n*) at computer system 101 and a second remote network port (e.g., port 121*n*) at network device(s) 108. In embodiments, the routing protocol component 112*a* implements an OSI model layer-three routing protocol, such as BGP, OSPF, or RIP.

In one example, the routing protocol component 112*a* at computer system 101 implements BGP, and a routing protocol component 112*b* at network device(s) 108 also implements BGP. In this example, these ongoing connections communicate BGP control plane data. Referring to FIG. 3A, in this example, the routing protocol configuration component 203 configures the routing protocol component 112*a* at computer system 101 to use port 302*a* (IP 192.168.20.1) and port 302*b* (IP 10.77.77.1) at network device 301 as neighbors, as follows:

```
neighbor 192.168.20.1 {
    router-id 192.168.20.5;
    local-address 192.168.20.5;
    local-as 65532;
    peer-as 65534;
}
neighbor 10.77.77.1 {
    router-id 192.168.20.5;
    local-address 10.77.77.2;
    local-as 65532;
    peer-as 65534;
}
```

Additionally, the routing protocol configuration component 203 may also provide a suggested configuration for a routing protocol component 112*b* at network device(s) 108. In some embodiments, the routing protocol configuration component 203 may also apply this suggested configuration to the routing protocol component 112*b* (e.g., via establishing a remote console connection to the network device(s) 108). Continuing the BGP example, this configuration may be as follows:

```
router bgp 65534
no synchronization
bgp log-neighbor-changes
network 10.77.77.0
network 192.168.20.0
network 192.168.10.0
redistribute connected
neighbor 10.77.77.2 remote-as 65532
neighbor 192.168.20.5 remote-as 65532
maximum-paths 8
no auto-summary
```

In embodiments, the route announcement component 204 announces an IP address of the loopback interface 119 as a route to the network device(s) 108. In embodiments, the route announcement component 204 does so using the routing protocol component 112*b*. In embodiments, based on having announced the IP address of the loopback interface 119 to the network device(s) 108, those devices update their own routing table (e.g., routing table 116*b*). In embodiments, announcing this route to network device(s) 108 enables the network device(s) 108 to route IP packets destinated to the IP address of loopback interface 119 into one of the computer system's network ports (e.g., port 114*a* to port 114*n*). In the context of FIG. 3A, if using BGP, the route announcement component 204 may announce a route comprising the IP address of loopback interface 306 to computer system 303 by issuing a command such as "announce route 192.168.22.1/32 next-hop self" to the routing protocol component 112*a*, which results in computer system 303 adding the route to routing table 309.

In embodiments, the route selection component 205 selects an interface for IP packet egress from computer system 101 from among the available port interfaces (e.g., port 121*a* to port 121*n*), and configures the default route 117 to use that interface (e.g., based on issuing a request to network stack 110). In embodiments, based on using the routing protocol component 112*a*, the forwarding failure detection component 206 detects when the interface being used as the default route is experiencing an IP packet forwarding failure, and the route selection component 205 dynamically updates the default route to use a different interface (e.g., one that is not experiencing IP packet forwarding failures). For example, in FIG. 3A, a routing table 307 of the computer system 303 has been initially configured by the route selection component 205 to have a default route 308*a* corresponding to port interface 305*a*, with a gateway address of 192.168.20.1 (i.e., the IP address of port 302*a*). In embodiments, this initial selection is based on one or more of a priority among network ports, a forwarding failure analysis by the forwarding failure detection component 206, a random selection, and the like. In FIG. 3A, port interface 305*a* is shown in heavy lines to indicate that it is being used as the default route, and the arrow that connects port interface 305*a* with port 302*a* is shown with a solid line to indicate that IP packet forwarding is successful when egressing IP packets via port interface 305*a*.

Figure 3B:
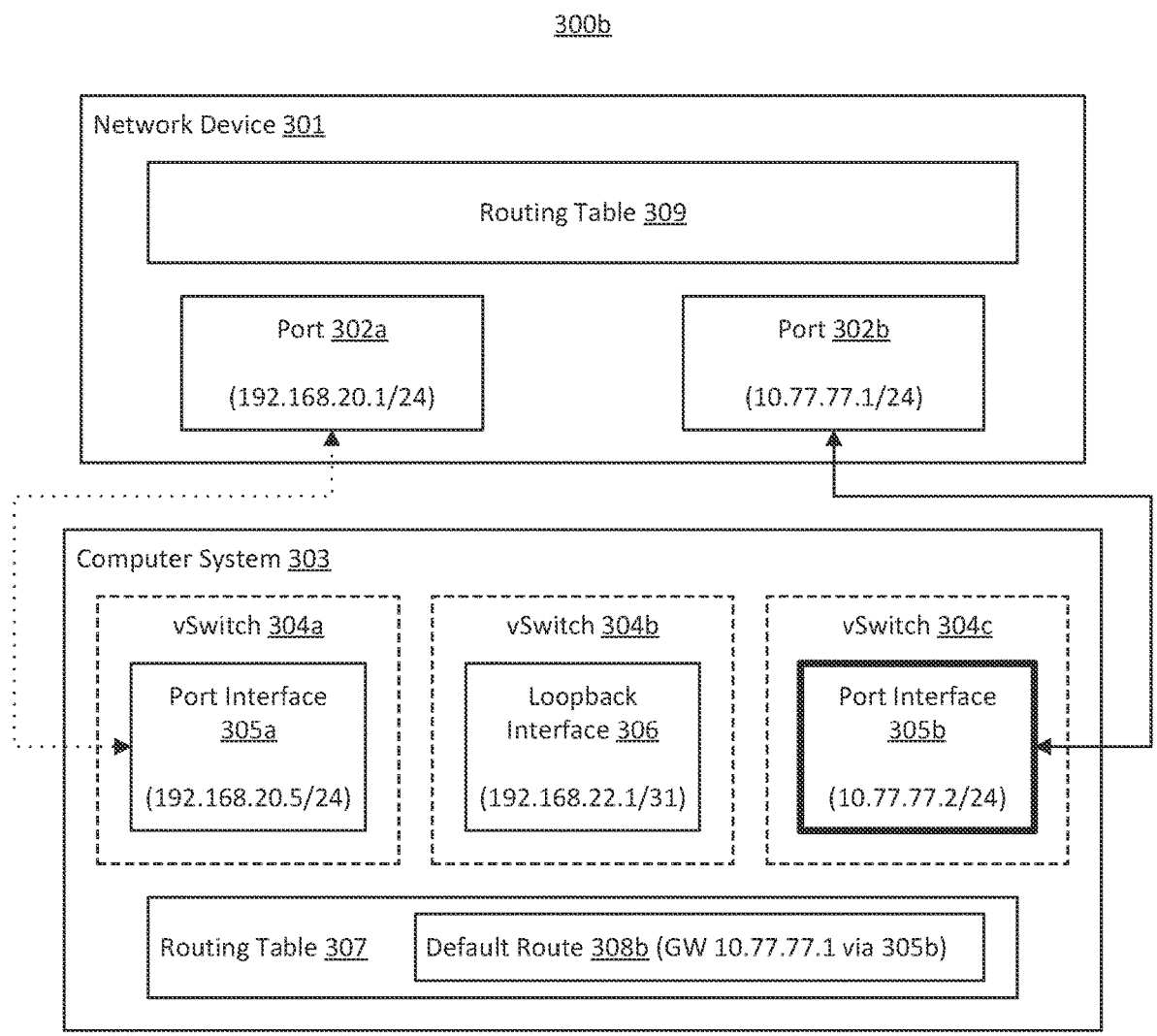

FIG. 3B illustrates an example 300*b*, representing the network environment example 300*a* after a forwarding failure has been detected by the forwarding failure detection component 206. In example 300*b*, the arrow that connects port interface 305*a* with port 302*a* is now shown with a broken line to indicate that IP packet forwarding has failed when egressing IP packets via port interface 305*a*, while the arrow that connects port interface 305*b* with port 302*b* is shown with a solid line to indicate that IP packet forwarding remains successful when egressing IP packets via port interface 305*b*. As such, the forwarding failure detection component 206 has detected a forwarding failure with respect to port interface 305*a*, and the route selection component 205 has now adjusted routing table 307 to have a default route 308*b* corresponding to port interface 305*b*, with a gateway address of 10.77.77.1 (i.e., the IP address of port 302*b*). In FIG. 3B, port interface 305*b* is now shown in heavy lines to indicate that it is being used as the default route.

Figure 3C:
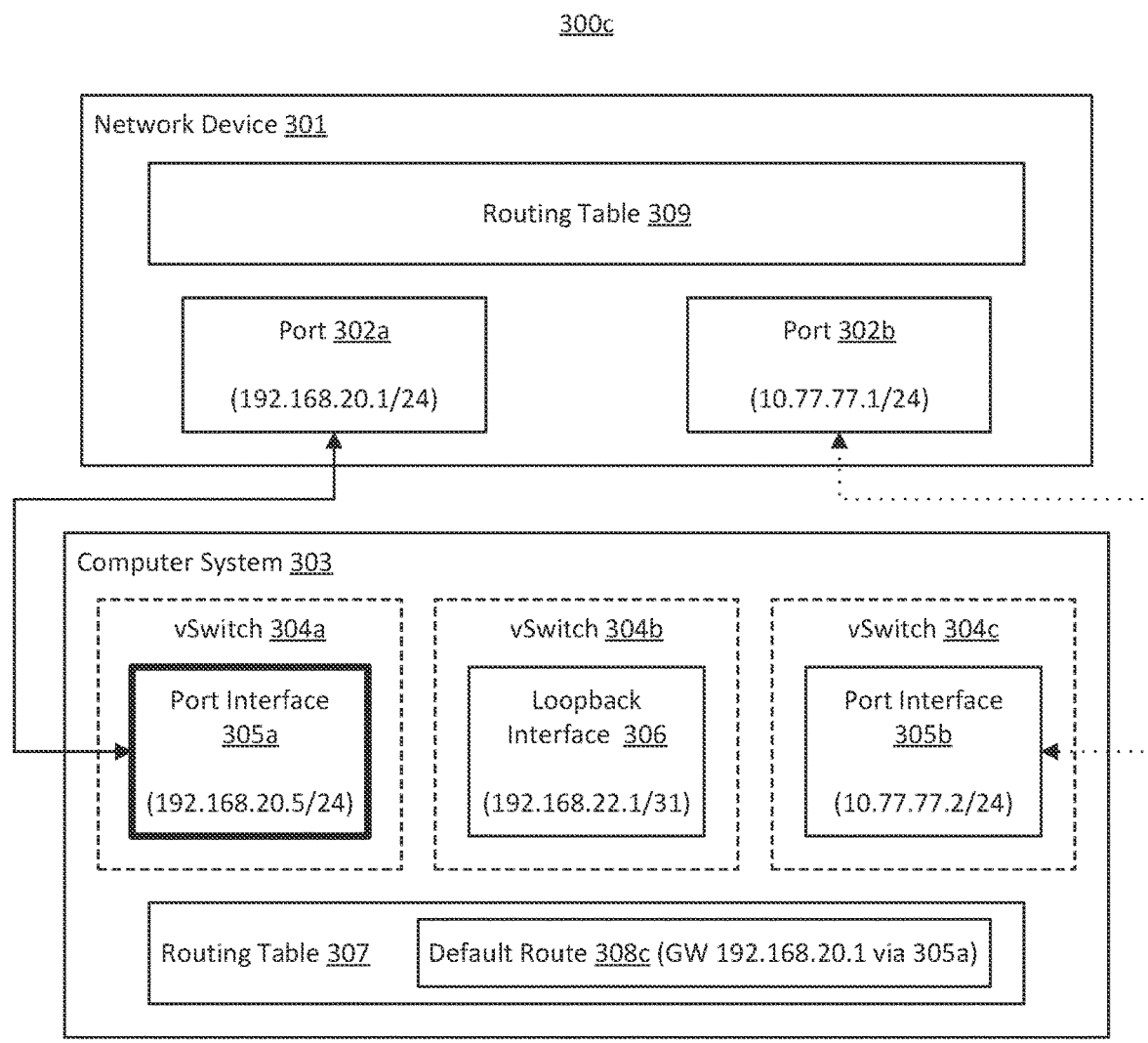

FIG. 3C illustrates an example 300*c*, representing the network environment example 300*b* after another forwarding failure has been detected by the forwarding failure detection component 206. In example 300*c*, the arrow that connects port interface 305*b* with port 302*b* is now shown with a broken line to indicate that IP packet forwarding has failed when egressing IP packets via port interface 305*b*, while the arrow that connects port interface 305*a* with port 302*a* is now shown with a solid line to indicate that IP packet forwarding is now successful when egressing IP packets via port interface 305*b*. As such, the forwarding failure detection component 206 has detected a forwarding failure with respect to port interface 305*b*, and the route selection component 205 has now adjusted routing table 307 to have a default route 308*c* corresponding to port interface 305*a*, with a gateway address of 192.168.20.1 (i.e., the IP address of port 302*a*). In FIG. 3C, port interface 305*a* is now shown in heavy lines to indicate that it is being used as the default route.

Example operation of the network failover component 111 is now further described in connection with FIG. 4, which illustrates a flow chart of an example method 400 using a routing protocol for network port failover in a single network stack environment having a single default route. In embodiments, instructions for implementing method 400 are encoded as computer-executable instructions (e.g., network failover component 111) stored on a computer storage medium (e.g., storage media 104) that are executable by a processor (e.g., processor(s) 102) to cause a computer system (e.g., computer system 101) to perform method 400.

As mentioned, in some embodiments, computer system 101 is a virtual machine host, such as a VMware ESX or ESXi host. Thus, in some embodiments of method 400, the computer system is a VMware ESX host or a VMware ESXi host.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Figure 4:
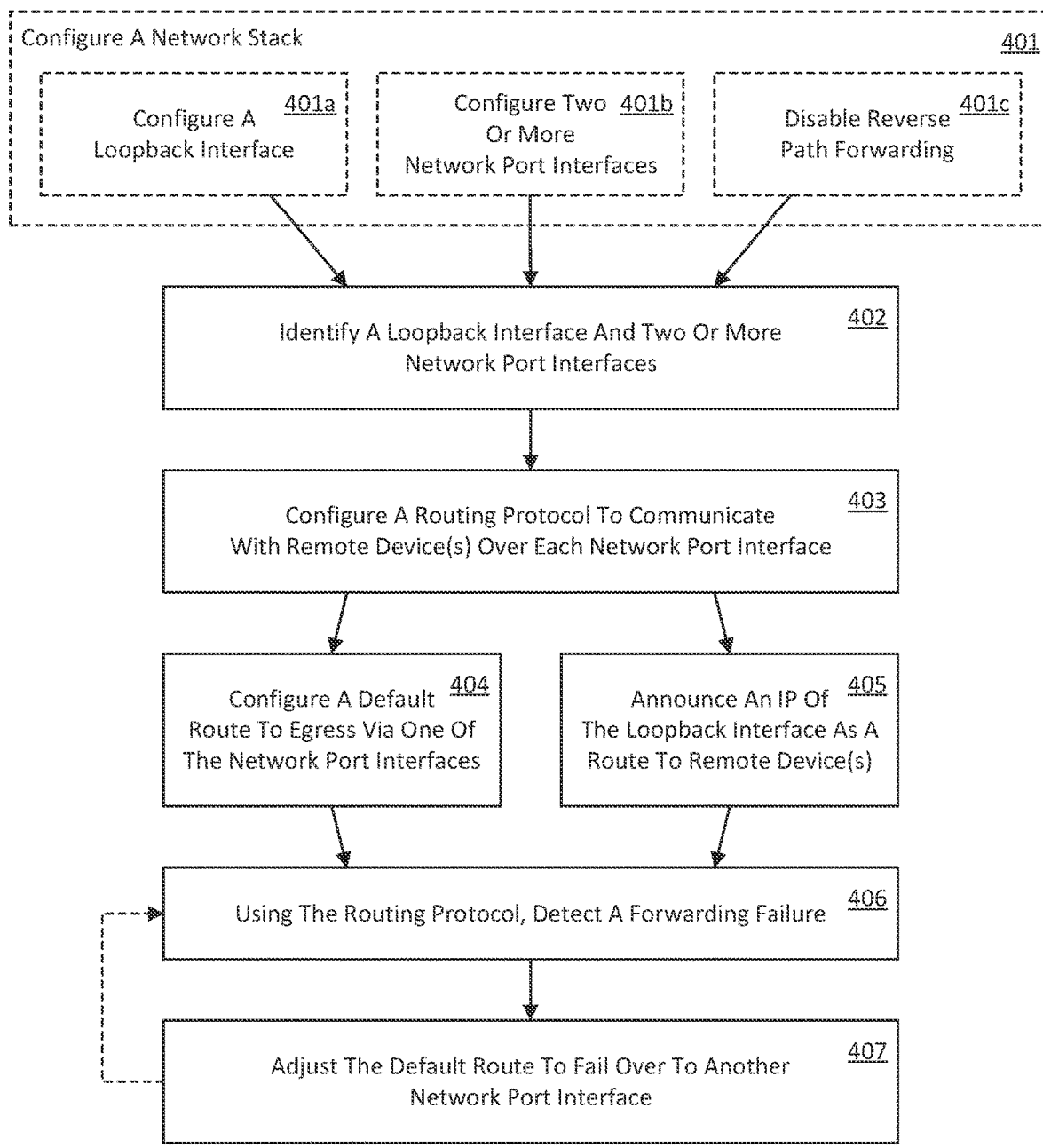
FIG. 4 illustrates a flow chart of an example method for using a routing protocol for network port failover in a single network stack environment having a single default route.

Referring to FIG. 4, in some embodiments, method 400 comprises an act 401 of configuring a network stack. As shown, act 401 can include one or more of an act 401*a* of configuring a loopback interface, an act 401*b* of configuring two or more network port interfaces, or an act 401*c* of disabling reverse path forwarding.

Act 401—including each of act 401*a*, act 401*b*, and act 401*c*—is shown in broken lines, indicating that any of act 401*a* to act 401*c* may be optional. Additionally, act 401*a*, act 401*b*, and act 401*c* are shown with no ordering requirement among the acts, meaning that they could be performed serially (in any order) or in parallel.

In some embodiments, act 401*a* comprises configuring a first interface provided by a network stack as a loopback interface. For example, the network stack configuration component 201 creates and/or configures loopback interface 119 (e.g., loopback interface 306 in FIG. 3A).

In some embodiments, act 401*b* comprises configuring one or more of: a second interface provided by the network stack as an interface to a first network port, or a third interface provided by the network stack as an interface to a second network port. For example, the network stack configuration component 201 creates and/or configures port interface 120*a* (e.g., port interface 305*a* in FIG. 3A) and/or port interface 120*n* (e.g., port interface 305*b* in FIG. 3A).

In some embodiments, act 401*c* comprises configuring the network stack to disable reverse path forwarding. In an example, the network stack configuration component 201 configures network stack instance 115 to disable a reverse path forwarding setting, resulting in the network stack instance 115 applying loose reverse path forwarding, meaning that the network stack will spoof a source address of outbound IP packets to have an IP address of the loopback interface (first interface).

Method 400 comprises an act 402 of identifying a loopback interface and two or more network port interfaces. In some embodiments, act 402 comprises identifying a plurality of interfaces configured at a network stack that does not perform reverse path forwarding. In embodiments, act 402 includes identifying at least (a) a first interface provided by the network stack as a loopback interface, and that is assigned a first IP address corresponding to a first IP subnet, (b) a second interface provided by the network stack as an interface to a first network port of the plurality of network ports, and that is assigned a second IP address corresponding to a second IP subnet that is different than the first IP subnet, and a (c) third interface provided by the network stack as an interface to a second network port of the plurality of network ports, and that is assigned a third IP address corresponding to a third IP subnet that is different than each of the first IP subnet and the second IP subnet. In an example, the interface identification component 202 identifies a first interface comprising loopback interface 119 (e.g., loopback interface 306 in FIG. 3A, with IP address 192.168.22.1 and subnet 192.168.22.0/31), as well as at least a second interface comprising port interface 120*a* for port 114*a* (e.g., port interface 305*a* in FIG. 3A, with IP address 192.168.20.5/subnet 192.168.20.0/24) and a third interface comprising port interface 120*n* for port 114*n* (e.g., port interface 305*b* in FIG. 3A, with IP address 10.77.77.2 and subnet 10.77.77.0/24).

Method 400 also comprises an act 403 of configuring a routing protocol to communicate with remote device(s) over each network port interface. In some embodiments, act 403 comprises configuring a routing protocol to communicate over the second interface with a first port at one or more remote network devices, and to communicate over the third interface with a second port at one or more remote network devices. In an example, the routing protocol configuration component 203 configures the routing protocol component 112*b* to establish a first routing protocol connection that communicates via port interface 120*a* (e.g., port interface 305*a* in FIG. 3A) across a link between port 114*a* and port 121*a* (e.g., port 302*a* in FIG. 3A), and establish a second routing protocol connection that communicates via port interface 120*n* (e.g., port interface 305*b* in FIG. 3A) across a link between port 114*n* and port 121*n* (e.g., port 302*b* in FIG. 3A). By establishing routing protocol connections, the computer system 101 can determine whether IP packets egressing from a given port interface are being forwarded by the network device(s) 108.

In embodiments, the routing protocol component 112a implements an OSI model layer-three routing protocol, such as BGP, OSPF, or RIP. Thus, in some embodiments of act 403, the routing protocol is an OSI model layer-three protocol. Additionally, in some embodiments of act 403, the routing protocol is one of BGP, OSPF, or RIP. In some embodiments, the routing protocol component 112a implements BGP, and configuring the routing protocol includes configuring ports at a remote device as neighbors (e.g., as demonstrated supra). Thus, in embodiments of act 403 the routing protocol is BGP, and configuring the routing protocol to communicate over the second interface (e.g., port interface 305a) with the first port (e.g., port 302a) at one or more remote network devices comprises configuring a fourth IP address (e.g., 192.168.20.1) of the first port as a neighbor of the second IP address (e.g., 192.168.20.5); and configuring the routing protocol to communicate over the third interface (e.g., port interface 305b) with a second port (e.g., port 302b) at one or more remote network devices comprises configuring a fifth IP address (e.g., 10.77.77.1) of the second port as a neighbor of the third IP address (e.g., 10.77.77.2).

Method 400 also comprises an act 404 of configuring a default route to egress via one of the network port interfaces. In some embodiments, act 404 comprises configuring a default route of the network stack to egress IP packets via the second interface. In an example, the route selection component 205 selects port interface 120a (e.g., port interface 305a in FIG. 3A) as a default route, and configures default route 117 (e.g., default route 308a, in FIG. 3A) accordingly. By configuring default route 117 in act 404, outbound IP packets for the loopback interface 119 (e.g., loopback interface 306 in FIG. 3A) are egressed via port interface 120a (e.g., port interface 305a in FIG. 3A). In embodiments, selection of a particular port interface in act 404 is based on a priority among network ports, a forwarding failure analysis by the forwarding failure detection component 206, a random selection, etc.

In embodiments, when configuring the second interface (e.g., port interface 305a) as the default route, act 404 assigns an IP address of that interface's corresponding remote port (e.g., port 302a) as the default gateway, Thus, in embodiments of act 404, and as shown in default route 308a of FIG. 3A, configuring the default route of the network stack to egress IP packets via the second interface comprises assigning a fourth IP address (e.g., 192.068.20.1) of the first port (e.g., port 302a) as a default gateway for the network stack, the fourth IP address corresponding to the second IP subnet (e.g., 192.168.20.0/24).

Method 400 also comprises an act 405 of announcing an IP of the loopback interface as a route to remote device(s). In some embodiments, act 405 comprises announcing, to the one or more remote network devices, a route comprising the first IP address. In an example, the route announcement component 204 announces a route to an IP address of loopback interface 119 (loopback interface 306 in FIG. 3A) to network device(s) 108 (computer system 303 in FIG. 3A). This enables remote network device(s) 108 to route IP packets destinated to the IP address of the loopback interface into one of the computer system's external network ports.

Notably, act 404 and act 405 are shown with no ordering requirement among the acts, meaning that they could be performed serially (in any order) or in parallel.

Since the network stack instance 115 applies loose reverse path forwarding, a source address of IP packets egressing via the second interface (e.g., port interface 120a/port interface 305a) is spoofed by the network stack instance 115 to include the first address assigned to the first interface (e.g., loopback interface 119/loopback interface 306). As such, in embodiments, based on the network stack not performing reverse path forwarding, the network stack assigns the first IP address as a source address for one or more IP packets being egressed via the second interface. Additionally, because the route announcement component 204 advertised this first address as a route in act 405, IP packets destined to the first IP address are routable to computer system 101/computer system 303. As such, a service (e.g., service(s) 113) running at the computer system is externally accessible at the first IP address.

Method 400 also comprises an act 406 of, using the routing protocol, detecting a forwarding failure. In some embodiments, act 406 comprises, after configuring the network stack to route IP packets via the second interface, determining, based on the routing protocol, that there is a forwarding failure associated with the second interface. In an example, referring to FIG. 3B, the forwarding failure detection component 206 uses the routing protocol component 112a to detect a failure to forward IP packets over port interface 305a.

Method 400 also comprises an act 407 of adjusting the default route to fail over to another network port interface. In some embodiments, act 407 comprises, based on determining that there is a forwarding failure associated with the second interface, configuring the default route of the network stack to egress IP packets via the third interface. In an example, referring to FIG. 3B, based on the forwarding failure detection component 206 having detected a failure to forward IP packets over port interface 305a, the route selection component 205 updates default route 308a to use port interface 305b. This enables two-way IP packet communications using the first IP address (e.g., 192.168.22.1) to continue over port interface 305b.

In embodiments, when configuring the third interface (e.g., port interface 305b) as the default route, act 407 assigns an IP address of that interface's corresponding remote port (e.g., port 302b) as the default gateway, Thus, in embodiments of act 407, configuring the default route of the network stack to egress IP packets via the third interface comprises assigning a fifth IP address (e.g., 10.77.77.1) of the second port (e.g., port 302b) as a default gateway for the network stack, the fifth IP address corresponding to the third IP subnet (e.g., 10.77.77.0/24).

Since the network stack instance 115 applies loose reverse path forwarding, a source address of IP packets now egressing via the third interface (e.g., port interface 120n/port interface 305b) is spoofed by the network stack instance 115 to include the first address assigned to the first interface (e.g., loopback interface 119/loopback interface 306). As such, in embodiments, based on the network stack not performing reverse path forwarding, the network stack assigns the first IP address as a source address for one or more IP packets being egressed via the third interface. Additionally, because the route announcement component 204 advertised this first address as a route in act 405, IP packets destined to the first IP address are routable to computer system 101/computer system 303. As such, a service (e.g., service(s) 113) running at the computer system remains externally accessible at the first IP address after the default route change.

A broken arrow, which connects act 407 and act 406, indicates that these acts can repeat to detect and respond to further IP packet forwarding failures. For example, referring to FIG. 3C, act 407 and act 406 can repeat to detect a failure to forward IP packets over port interface 305b, and update default route 308c to use port interface 305a.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system (e.g., computer system 101) that includes computer hardware, such as, for example, one or more processors (e.g., processor(s) 102) and system memory (e.g., memory 103), as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 104). Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network hardware 105), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:

1. A method, implemented at a computer system that includes a processor and a plurality of network ports, for using BGP (border gateway protocol) for network port failover in a single network stack environment having a single default route, the method comprising:
    identifying a plurality of interfaces configured at a network stack that does not perform reverse path forwarding, including identifying at least:
        a first interface provided by the network stack as a loopback interface, and that is assigned a first IP (internet protocol) address corresponding to a first IP subnet,
        a second interface provided by the network stack as an interface to a first network port of the plurality of network ports, and that is assigned a second IP address corresponding to a second IP subnet that is different than the first IP subnet, and
        a third interface provided by the network stack as an interface to a second network port of the plurality of network ports, and that is assigned a third IP address corresponding to a third IP subnet that is different than each of the first IP subnet and the second IP subnet;
    configuring BGP to communicate over the second interface with a first port at one or more remote network devices, and to communicate over the third interface with a second port at one or more remote network devices;
    announcing, to the one or more remote network devices, a route comprising the first IP address;
    configuring a default route of the network stack to egress IP packets via the second interface;
    after configuring the network stack to route IP packets via the second interface, determining, based on BGP, that there is a forwarding failure associated with the second interface; and
    based on determining that there is a forwarding failure associated with the second interface, configuring the default route of the network stack to egress IP packets via the third interface.

2. The method of claim 1, wherein, based on the network stack not performing reverse path forwarding, the network stack assigns the first IP address as a source address for one or more IP packets being egressed via the second interface or the third interface.

3. The method of claim 2, wherein:
    configuring the routing protocol to communicate over the second interface with the first port at one or more remote network devices comprises configuring a fourth IP address of the first port as a neighbor of the second IP address; and
    configuring the routing protocol to communicate over the third interface with a second port at one or more remote network devices comprises configuring a fifth IP address of the second port as a neighbor of the third IP address.

4. The method of claim 1, wherein the computer system is a VMware ESX host or a VMware ESXi host.

5. The method of claim 1, wherein a service running at the computer system is externally accessible at the first IP address.

6. The method of claim 1, further comprising configuring the network stack to disable reverse path forwarding.

7. The method of claim 1, wherein:
    configuring the default route of the network stack to egress IP packets via the second interface comprises assigning a fourth IP address of the first port as a default gateway for the network stack, the fourth IP address corresponding to the second IP subnet; and
    configuring the default route of the network stack to egress IP packets via the third interface comprises assigning a fifth IP address of the second port as the default gateway for the network stack, the fifth IP address corresponding to the third IP subnet.

8. The method of claim 1, further comprising configuring one or more of the first interface, the second interface, or the third interface.

9. A computer system for using an OSI (open systems interconnection) model layer-three protocol for network port failover in a single network stack environment having a single default route, comprising:
    a processor;
    a plurality of network ports; and
    a computer storage medium that stores computer-executable instructions that are executable by the processor to cause the computer system to at least:
        identify a plurality of interfaces configured at a network stack that does not perform reverse path forwarding, including identifying at least:
            a first interface provided by the network stack as a loopback interface, and that is assigned a first IP (internet protocol) address corresponding to a first IP subnet,
            a second interface provided by the network stack as an interface to a first network port of the plurality of network ports, and that is assigned a second IP address corresponding to a second IP subnet that is different than the first IP subnet, and
            a third interface provided by the network stack as an interface to a second network port of the plurality of network ports, and that is assigned a third IP address corresponding to a third IP subnet that is different than each of the first IP subnet and the second IP subnet;
        configure an OSI model layer-three routing protocol to communicate over the second interface with a first port at one or more remote network devices, and to communicate over the third interface with a second port at one or more remote network devices;
        announce, to the one or more remote network devices, a route comprising the first IP address;

configure a default route of the network stack to egress IP packets via the second interface;

after configuring the network stack to route IP packets via the second interface, determine, based on the OSI model layer-three routing protocol, that there is a forwarding failure associated with the second interface; and based on determining that there is a forwarding failure associated with the second interface, configure the default route of the network stack to egress IP packets via the third interface.

10. The computer system of claim 9, wherein, based on the network stack not performing reverse path forwarding, the network stack assigns the first IP address as a source address for one or more IP packets being egressed via the second interface or the third interface.

11. The computer system of claim 9, wherein the OSI model layer-three routing protocol is one of BGP (border gateway protocol), OSPF (open shortest path first), or RIP (routing information protocol).

12. The computer system of claim 9, wherein the computer system is a VMware ESX host or a VMware ESXi host.

13. The computer system of claim 9, wherein a service running at the computer system is externally accessible at the first IP address.

14. The computer system of claim 9, the computer-executable instructions also including instructions that are executable by the processor to cause the computer system to configure the network stack to disable reverse path forwarding.

15. The computer system of claim 9, wherein:

configuring the default route of the network stack to egress IP packets via the second interface comprises assigning a fourth IP address of the first port as a default gateway for the network stack, the fourth IP address corresponding to the second IP subnet; and configuring the default route of the network stack to egress IP packets via the third interface comprises assigning a fifth IP address of the second port as the default gateway for the network stack, the fifth IP address corresponding to the third IP subnet.

16. The computer system of claim 9, the computer-executable instructions also including instructions that are executable by the processor to cause the computer system to configure one or more of the first interface, the second interface, or the third interface.

17. A computer program product comprising a hardware storage medium that stores computer-executable instructions that are executable by a processor to cause a computer system to use a routing protocol for network port failover in a single network stack environment having a single default route, the computer-executable instructions including instructions that are executable by the processor to cause the computer system to at least:

identify a plurality of interfaces configured at a network stack that does not perform reverse path forwarding, including identifying at least:

a first interface provided by the network stack as a loopback interface, and that is assigned a first IP (internet protocol) address corresponding to a first IP subnet, a second interface provided by the network stack as an interface to a first network port of a plurality of network ports of the computer system, and that is assigned a second IP address corresponding to a second IP subnet that is different than the first IP subnet, and a third interface provided by the network stack as an interface to a second network port of the plurality of network ports, and that is assigned a third IP address corresponding to a third IP subnet that is different than each of the first IP subnet and the second IP subnet;

configure a routing protocol to communicate over the second interface with a first port at one or more remote network devices, and to communicate over the third interface with a second port at one or more remote network devices;

announce, to the one or more remote network devices, a route comprising the first IP address;

configure a default route of the network stack to egress IP packets via the second interface;

after configuring the network stack to route IP packets via the second interface, determine, based on the routing protocol, that there is a forwarding failure associated with the second interface; and based on determining that there is a forwarding failure associated with the second interface, configure the default route of the network stack to egress IP packets via the third interface.

18. The computer program product of claim 17, wherein the routing protocol is one of BGP (border gateway protocol), OSPF (open shortest path first), or RIP (routing information protocol).

19. The computer program product of claim 17, wherein the routing protocol is an OSI (open systems interconnection) model layer-three protocol.

20. The computer program product of claim 17, wherein in the computer system is a VMware ESX host or a VMware ESXi host.

* * * * *